US011099551B2

(12) United States Patent
Ristovski et al.

(10) Patent No.: US 11,099,551 B2
(45) Date of Patent: Aug. 24, 2021

(54) DEEP LEARNING ARCHITECTURE FOR MAINTENANCE PREDICTIONS WITH MULTIPLE MODES

(71) Applicant: Hitachi, Ltd., Tokyo (JP)

(72) Inventors: Kosta Ristovski, San Jose, CA (US); Chetan Gupta, San Mateo, CA (US); Ahmed Farahat, Santa Clara, CA (US); Onur Atan, Goleta, CA (US)

(73) Assignee: Hitachi, Ltd., Tokyo (JP)

( * ) Notice: Subject to any disclaimer, the term of this patent is extended or adjusted under 35 U.S.C. 154(b) by 878 days.

(21) Appl. No.: 15/884,986

(22) Filed: Jan. 31, 2018

(65) Prior Publication Data

US 2019/0235484 A1 Aug. 1, 2019

(51) Int. Cl.
| | |
|---|---|
| *G06N 20/00* | (2019.01) |
| *G05B 23/02* | (2006.01) |
| *G06N 7/00* | (2006.01) |
| *G06N 5/04* | (2006.01) |
| *G06F 17/11* | (2006.01) |

(52) U.S. Cl.
CPC ..... *G05B 23/0283* (2013.01); *G05B 23/0254* (2013.01); *G06F 17/11* (2013.01); *G06N 5/04* (2013.01); *G06N 7/005* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2010/0169030 A1* | 7/2010 | Parlos | ...................... | G01H 1/00 |
| | | | | 702/58 |
| 2018/0341876 A1* | 11/2018 | Ghosh | ...................... | G06N 5/04 |
| 2019/0057307 A1* | 2/2019 | Zheng | .................. | G06N 3/0445 |
| 2020/0258057 A1* | 8/2020 | Farahat | ..................... | G06N 3/08 |

\* cited by examiner

*Primary Examiner* — David R Vincent
(74) *Attorney, Agent, or Firm* — Procopio, Cory, Hargreaves & Savitch LLP

(57) ABSTRACT

Example implementations described herein involve a system for maintenance predictions generated using a single deep learning architecture. The example implementations can involve managing a single deep learning architecture for three modes including a failure prediction mode, a remaining useful life (RUL) mode, and a unified mode. Each mode is associated with an objective function and a transformation function. The single deep learning architecture is applied to learn parameters for an objective function through execution of a transformation function associated with a selected mode using historical data. The learned parameters of the single deep learning architecture can be applied with streaming data from with the equipment to generate a maintenance prediction for the equipment.

20 Claims, 7 Drawing Sheets

DEEP LEARNING ARCHITECTURE FOR MAINTENANCE PREDICTIONS WITH MULTIPLE MODES

BACKGROUND

Field

The present disclosure is generally directed to deep learning architecture, and more specifically, to systems and methods for generating maintenance recommendations based on a single deep learning architecture with multiple modes.

Related Art

Equipment uptime is an increasingly important aspect of maintenance across difference industries which seek new ways to increase equipment availability. In related art, predictive maintenance is used to increase equipment availability, improve the safety of operators, and reduce the environmental incidents. Detecting failures in the system by condition based maintenance (CBM) may be insufficient, because at the time of failure occurrence, spare replacement parts for failed components or the maintenance personnel needed may be unavailable.

In related art, algorithmic predictors of component failures and remaining useful life (RUL) estimators have been developed. These predictors are machine learning models that capture degradation process within a component and predict: (i) if failure of the component will happen within a given time window (failure prediction) or (ii) time when component performance will be below operational requirements (RUL).

In related art, failure prediction and remaining useful life approaches are optimized using separate architectures to develop different models with different objective functions. Reliance on different models and different architectures lead to inconsistent predictions when applied to the same component simultaneously. Inconsistent predictions cause uncertainty and decreases a decision maker's confidence when using the predictions in the decision making process. For example, a failure prediction model can predict that a failure is likely to happen in an approaching 5 day time window with a 80% probability, while a separate independently developed RUL model may predict that the same component has 10 days until a next failure making predictive maintenance scheduling difficult. Miss-scheduled maintenance increases the operating costs of the equipment and can increase the occurrence of failures that decreases equipment uptime.

SUMMARY

Example implementations described herein involve a single deep learning architecture and framework to predict failures or Remaining Useful Life (RUL) both simultaneously and independently. The single deep learning architecture is used for maintenance recommendation that can be utilized by, but is not limited to, equipment end-users and/or operators, maintenance personnel and management, decision makers, and operation managers.

In example implementations, the base architecture stack-up defines the network layer types which are included in the model and the relationship between them. The base architecture stack-up is problem specific and it is assumed to be specified by the user. The base architecture can involve layer types such as Convolutional Neural Network (CNN), Long Short Term Memory (LSTM), and multi-layer fully connected neural network (NN).

In example implementations, the network architecture is created based on input network architecture parameters and base architecture stack-up. Network architecture parameters include, but are not limited to, the number of convolutional layers, number of convolutional filters in each layer, number of LSTM layers, number of LSTM units in each layer, number of fully connected layers, number of hidden units in each fully connected hidden layer, dropout rate (CNN layers, LSTM layers, fully connected layers), training optimization algorithm, training optimization algorithm learning rate, objective function for training, and so on.

Example implementations are directed to addressing the problem of inconsistent model outputs to increase insights into maximizing equipment uptime. The single deep learning architecture is trained using historical operational data to provide consistent prediction values and confidence levels for estimates using time sequence sensor data. Such example implementations involve learning parameters for objective functions through execution of transformation functions that allow for different probability distribution choices.

The single deep learning architecture supports multiple modes. To provide consistency between outputs of predictive models and also provide flexibility for learning independent models, the single deep learning architecture includes three modes of use: (1) failure prediction mode; (2) Remaining Useful Life (RUL) mode; and (3) unified mode with failure prediction and remaining useful life in single model to ensure consistent predictions. An example aspect includes functionality to clean and pre-process raw training data that the single deep learning architecture uses to learn parameters for a model based on a selected mode. Aspects of the present disclosure provide improved deep learning performance by accounting for both failed and non-failed examples with different penalties. Necessary transformations of deep learning output are defined to map the outputs to particular mode. Example aspects allow for unrestricted probability distributions and cost functions at the output to generate maintenance predictions. The example implementations described herein can be used as a standalone solution or be integrated with existing systems to optimize predictive maintenance scheduling.

Aspects of the present disclosure can include a system configured to manage a single deep learning architecture for three modes including a failure prediction mode, a remaining useful life (RUL) mode, and a unified mode. Each mode is associated with an objective function and a transformation function. The system receives a mode selection and historical data associated with equipment to that are used to apply the single deep learning architecture to learn parameters of the associated objective function through execution of the associated transformation function of the selected mode. For subsequently received streaming data associated with the equipment, the system is configured to apply the learned parameters of the single deep learning architecture and associated transformation function to generate a maintenance prediction for the equipment.

Aspects of the present disclosure further include a method for managing a single deep learning architecture with three modes including a failure prediction mode, a RUL mode, and a unified mode, where each mode is associated with an objective function and a transformation function. The method can include applying the single deep learning architecture to learn parameters of the associated objective function through execution of the associated transformation function of a selected mode in response to receiving the mode selection and historical data associated with equipment. For subsequently received streaming data associated with the equipment, the method includes applying the learned parameters of the single deep learning architecture and associated transformation function to generate a maintenance prediction for the equipment.

Aspects of the present disclosure further include a computer program for managing a single deep learning architecture with three modes including a failure prediction mode, a RUL mode, and a unified mode, where each mode is associated with an objective function and a transformation function. The computer program can include applying the single deep learning architecture to learn parameters of the associated objective function through execution of the associated transformation function of a selected mode in response to receiving the mode selection and historical data associated with equipment. For subsequently received streaming data associated with the equipment, the computer program can include instructions for applying the learned parameters of the single deep learning architecture and associated transformation function to generate a maintenance prediction for the equipment.

Aspects of the present disclosure further include a system for managing a single deep learning architecture with three modes including a failure prediction mode, a RUL mode, and a unified mode, where each mode is associated with an objective function and a transformation function. The system can include means for applying the single deep learning architecture to learn parameters of the associated objective function through execution of the associated transformation function of a selected mode in response to receiving the mode selection and historical data associated with equipment. For subsequently received streaming data associated with the equipment, the system can include means for applying the learned parameters of the single deep learning architecture and associated transformation function to generate a maintenance prediction for the equipment.

DETAILED DESCRIPTION

Figure 1A:
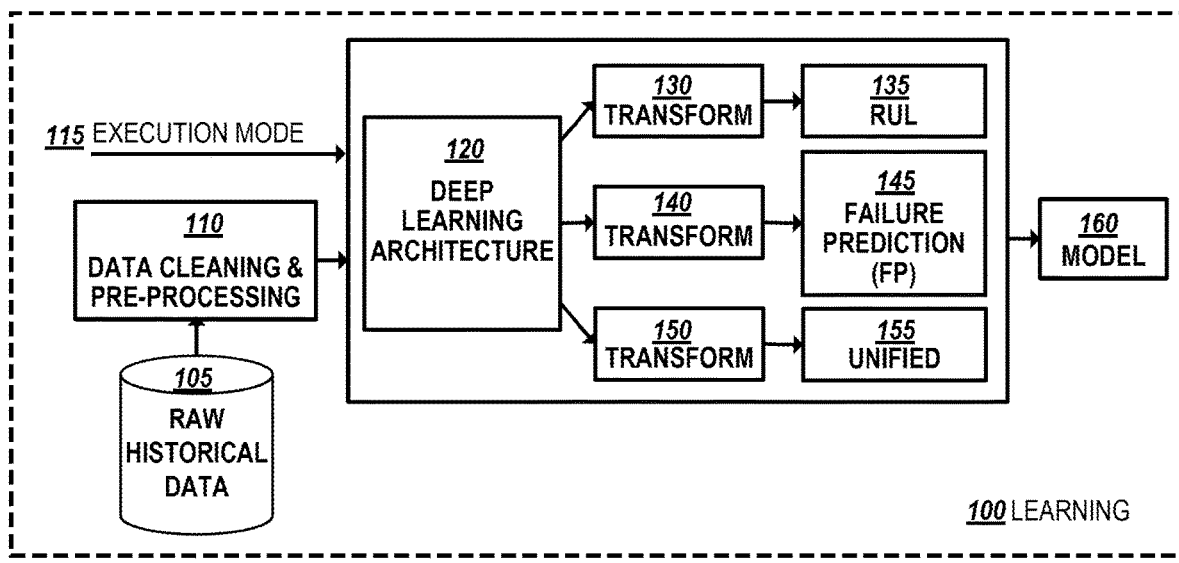
FIG. 1(a) illustrates a flow of an example learning phase, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In the related art implementations, failure prediction and Remaining Useful Life approaches independently develop models with inconsistency in the predictions between the two approaches for the same piece of equipment. Equipment operators and maintenance service providers spend time and resources maintaining independently developed models and resolving the inconsistencies produced by the different approaches.

In the example implementations described herein, consistent maintenance predictions for a piece of equipment are generated by applying a single deep learning architecture. The piece of equipment can include sensors that monitor and log the performance data. Historical performance data for the piece of equipment can be analyzed to train different predictive maintenance models using the single deep learning architecture. In the example implementations described herein, equipment operators can use the predictive maintenance models customized for the piece of equipment with new performance data to schedule maintenance operations, order spare parts, and maximize uptime for the piece of equipment. Operators that maintain a large number of components and different types of equipment can reduce the time and resources spent maintaining predictive maintenance models, generating maintenance predictions, and resolving inconsistent maintenance predictions by using the single deep learning architecture described herein.

The single deep learning architecture is applied in two phases that include a training phase using historical data to develop a predictive maintenance model, and an application phase using collected sensor data to apply the predictive maintenance model. The single deep learning architecture supports three execution modes for different predictive maintenance models that include a failure prediction mode, a Remaining Useful Life mode, and a unified mode. Each execution modes has different objective functions, and transformation functions from the other execution modes. The objective function and transformation function for the unified mode combines elements from failure prediction and Remaining Useful Life approaches. The different execution modes allow an operator freedom to select or program three different objective functions without maintaining different architectures.

FIG. 1(a) illustrates a flow of an example learning phase 100, in accordance with an example implementation. The learning phase 100 analyzes raw historical data 105 for a piece of equipment to organize, clean, and pre-process data 110. Raw historical data 105 can include, for example, sensor data, event data, failure data, metadata, etc. associated with a piece and/or type of equipment.

Sensor data can include streaming data and/or historical time series data collected from different sensors. Each time series represent the readings of the sensor value over time. Each sensor reading is associated with a timestamp that specifies the date and time of the reading. The sensor data can be collected from a single sensor in batches, where each batch of sensor data includes multiple sensor readings (e.g., a batch of readings from a sensor over multiple days). Data collection can be adapted to account for gaps between batches. For example, the data for a day can be received by a monitoring facility at the end of each day. The data collection frequency can also differ from one sensor to another.

Event data can include sequences of events with different types of events (e.g., maintenance actions, alarms, etc.). Each event is associated with a timestamp that specifies the date and time of the event occurrence. Event data may be collected, for example, in real-time as events are reported to an operator.

Failure data can include discrete failure events that happened in the past. Each failure event is associated with a time-stamp that specifies the date and may include the time of the failure if detectable. In an example implementation, failure data can include associated attributes (e.g., a type of the failure, an identifier for a component that failed, a cause of the failure, a repair action, etc.).

Metadata can include data that describes extra information about a characteristic of the equipment and/or an environment in which the equipment is installed. For example, metadata can include, but is not limited to, the specifications of the equipment (e.g., a model number, a make or build version, capacity statistics, etc.), operation conditions (e.g., operation hours), environment conditions (e.g., location, temperature, humidity, etc.), installation information (e.g., an installation date, install settings, etc.), and maintenance records (e.g., maintenance dates, repairs performed, conditions, notes, etc.). Sensor data, event data, failure data, and metadata can appear in structured, semi-structured, or unstructured formats.

Data pre-processing 110 is performed on the raw historical data 105 input that includes, for example, sensor data, event data, failure data, metadata, etc. associated with a piece and/or type of equipment. Data input for predictions is a set of time sequences generated from sensor measurements, sequence of operations, and events generated during the operations of the component/system which might be relevant to a problem. Pre-processing data 110 preparation steps can be performed before the data is used as an input to a deep learning algorithm.

Sensor data is may be collected from different data streams (e.g., equipment sensors, weather data, etc.). Each time series can include a different sampling rate and the data can be transmitted in batches of different sizes. Data is consolidated from different sources that can be organized in a tabular format with columns to represent the sensors and each row to represent the sensor readings at a unique timestamp. The rows in the consolidated data are referred to as data records. Outliers are removed and the data is prepared in a format consumable by the deep learning architecture.

Pre-processing data 110 preparation can include creating a common sequence on a component time-scale, perform feature extraction on the pre-processed data, identify operation status changes for each component. The labels can include one or more of a failure label, a RUL label, and a component failure label.

In an example implementation, the streaming data from one or more sensors monitoring a component of the equipment is preprocessed into a format consumable by the single deep learning architecture. In an example implementation, pre-processing can include constructing component based sequences to transform a conventional time-scale to a component time-scale, creating a common sequence on the component time-scale using a timestamp from the one or more sensors, updating the historical data to adjust outlier values based on other readings of the same sensor, and calculating sensor values for the common sequence based on the updated historical data.

Component based sequence construction is used to make data conform a format consumable by deep learning. During sequence construction, it is necessary to transform conventional time-scale to component time-scale using operating hours. For example, sequence construction removes non-operational time (e.g., equipment downtimes, lunch breaks, etc.) from conventional time-scale for each measurement.

A common sequence is defined on component time-scale for the output data. For example, the common sequence can be generated based on a fixed gap (e.g., every 5 minutes) or by using the timestamps from the one of the sensors (e.g., the one with the largest number of readings). For each sensor time series, pre-processing data 110 can include outlier detection, sensor estimations, event transformation, etc. For example, detecting outliers in the sensor readings can remove or replace outliers with values calculated based on other readings of the same sensor (e.g., average or median of nearest neighbors).

Estimating the sensor values can be done, for example, at each common timestamp by interpolating the readings of the sensor time series at nearby timestamps. For example, sensor estimation can be conducted by learning a regression model for the original time series and finding the values of regression function at the common timestamps.

Event transformation can include, for example, transforming event data to time sequences by using binary encoding for each type of event. In an example implementation, each event type is assigned a value of 1 to the closest common timestamp from the event occurrence and a value of 0 to the other common timestamps.

Pre-processing data 110 can output the new sensor time series assembled into records. Feature extraction is performed on the pre-processed data and operation status changes can be identified for each component. Feature extraction (e.g., sensor data compression) can include applying windows over the data using (a) predefined functions over the windows such as minimum, maximum, percentiles, average, Fast Fourier Transform (FFT), etc. (b) applying on Convolutional Neural Networks (CNNs) for automatic feature extraction. When automatic feature extraction using CNN is applied, then the same should be defined in the base architecture stack-up. Labels are created for each element of the created sequence with corresponding RUL value or failure values for the deep learning model parameters in the training and learning phase 100.

Operation status can be identified when the equipment changes from one state to another (e.g., "off" to "operation" or vice versa). In an example implementation, operation status can be detected using the raw signals from the sensors that experience high fluctuations right after a status change. Information about the relations between different signals can be difficult to obtain during fluctuations. Accordingly, data is labeled as "stable status" or "transition status" to identify the useful stable information.

The deep learning architecture 120 includes convolutional Neural Network (CNN), Long Short Term Memory (LSTM), multi-layer fully connected neural network (NN), and transformation layer. As discussed in reference to FIG.

2, a user-defined base architecture stack-up is created. The base architecture stack-up for is defined as the relationship between the convolutional layer, LSTM layer and NN layer, and transformation. Output of fully the connected NN layer can be strictly two-dimensional. The base architecture involves many architectural parameters. These include but are not limited to the number of convolutional layers, number of convolutional filters, convolutional filter size, number of LSTM layers, number of LSTM nodes, number of NN layers, number of NN hidden nodes, dropout rate, etc. In an example implementation, the architectural parameters are set by user.

According to an example implementation, a user a selects an execution mode 115 (e.g., a failure prediction mode, a RUL mode, or a unified mode) depending on the form of predictions they choose for a particular use case. The pre-processed data 110 and a selected execution mode 115 (e.g., a failure prediction mode, a RUL mode, or a unified mode) are provided to the deep learning architecture 120 to develop a predictive maintenance model 160. Based on the selected execution mode 115, a transformation function 130, 140, 150 and objective function 135, 145, 155 that correspond to the selected execution mode are automatically assigned to the deep learning architecture 120.

To produce a model 160 an execution mode 115 can be selected at a time. For example, for a selected execution mode 115 of the unified mode, the deep learning architecture 120 automatically assigns the transformation function 150 and unified objective function 155 to produce a model 160. Using the preprocessed data 110, selected execution mode 115, the deep learning architecture 120 learns parameters for the corresponding objective function 135, 145, 155 through execution of the transformation function 130, 140, 150 to produce the model 160.

Example implementations can involve a common network architecture that is adjusted using transformations and different objective functions to handle three different modes (e.g., failure prediction only, remaining useful life only, unified approach (simultaneous prediction)). The common network architecture also supports different choices of probability distributions to be used in a model. The network architecture parameters are learned in order to optimize the objective functions.

The three objective functions each correspond to a different execution mode (e.g., failure prediction mode, RUL mode, unified mode).of the framework. Objective functions are defined so that they can be supplied with data from both failed components and non-failed components. Objective functions allow for several probability distribution choices, which for example, are positive distributions. The network outputs are adjusted to specific distribution or objective functions using transformation of the output of the neural network structure. The three transformations correspond to each execution mode. For example, a generated trained model is used to determine different estimates or predictions for the equipment based on the selected mode.

Failure prediction predicts whether a device will fail within a time horizon. Remaining useful life (RUL) estimates a time difference between the current time and time of the failure event. Estimating RUL and predicting failures involves incorporating information from time sequence sensor data, event data, failure data and operational data. To create accurate unified approach RUL the following steps should be executed in the sequence presented.

Figure 1B:
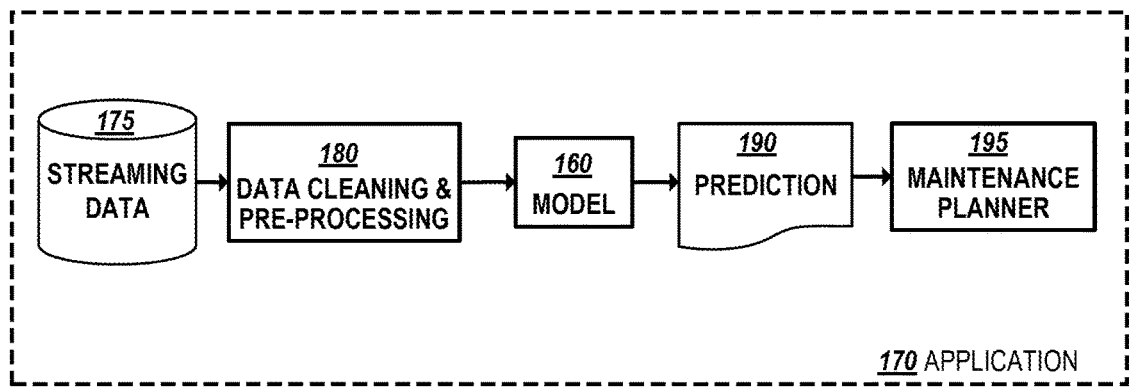
FIG. 1(b) illustrates a flow of an example application phase, in accordance with an example implementation.

FIG. 1(b) illustrates a flow of an example application phase 170, in accordance with an example implementation. The application phase 170 analyzes streaming data 175 for the piece of equipment to organize, clean, and pre-process data 180. The model 160 uses the pre-processed data 180 to generate a maintenance prediction 190 for the piece of equipment. The maintenance prediction 190 form is defined by the execution mode 115 selected to develop the model 160. The maintenance prediction 190 can be passed to a maintenance planner 195 which, for example, can determine spare part stock management, dynamic maintenance scheduling, etc.

Figure 2:
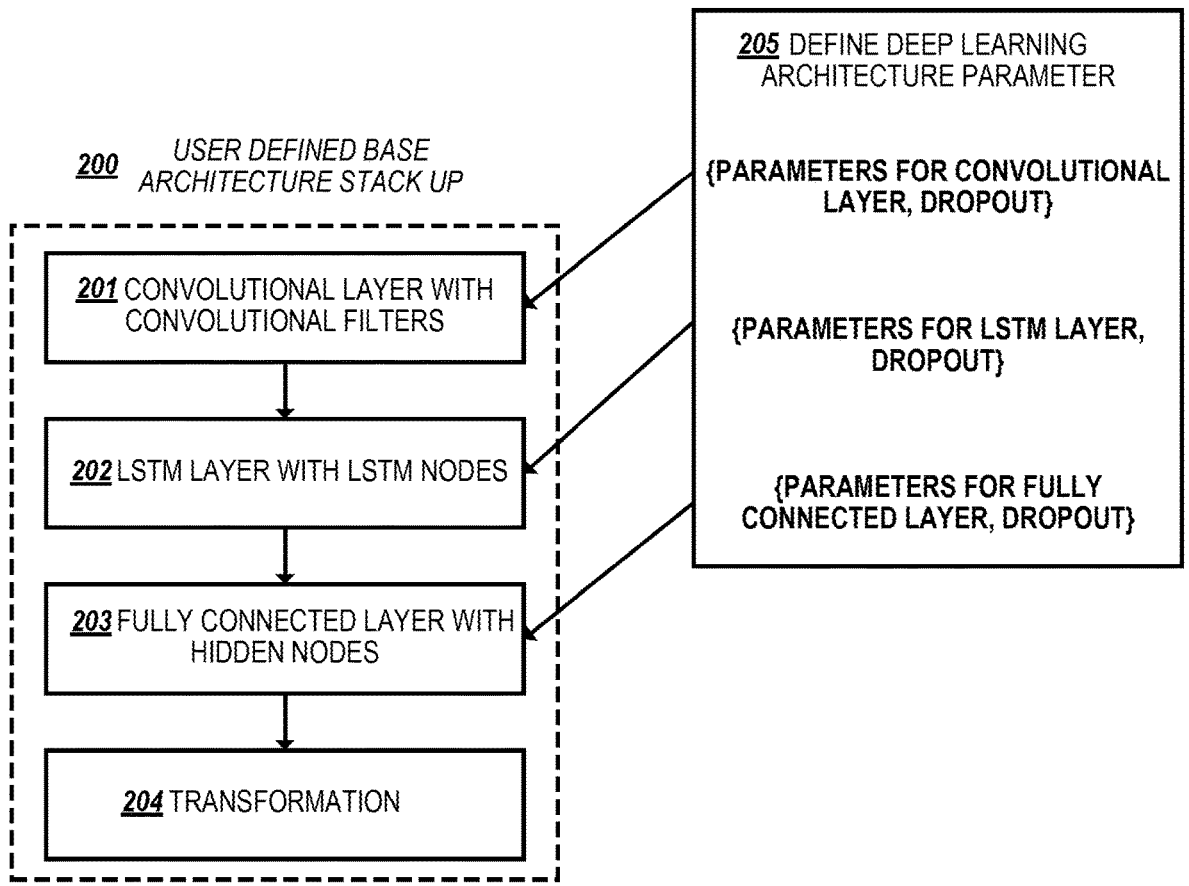
FIG. 2 illustrates a base architecture stack-up, in accordance with an example implementation.

FIG. 2 illustrates a base architecture stack-up 200, in accordance with an example implementation. Example implementations are directed to a common deep learning architecture for predicting remaining useful life and failure prediction either independently or simultaneously. The base architecture stack-up 200 defines network layer types which are included in the model. The base architecture stack-up 200 is problem specific and can be specified by the user. The base architecture can involve layer types such as Convolutional Neural Network (CNN) 201, Long Short Term Memory (LSTM) 202, multi-layer fully connected neural network (NN) 203, and transformation layer 204.

In example implementations, the network architecture is created based on input network architecture parameters 205 and the base architecture stack-up 200. Network architecture parameters can include, but are not limited to, a number of convolutional layers, a number of convolutional filters in each layer, a number of LSTM layers, a number of LSTM units in each layer, a number of fully connected layers, a number of hidden units in each fully connected hidden layer, dropout rates (CNN layers, LSTM layers, fully connected layers), training optimization algorithms, training optimization algorithm learning rates, objective functions for training, and so on.

Figure 3:
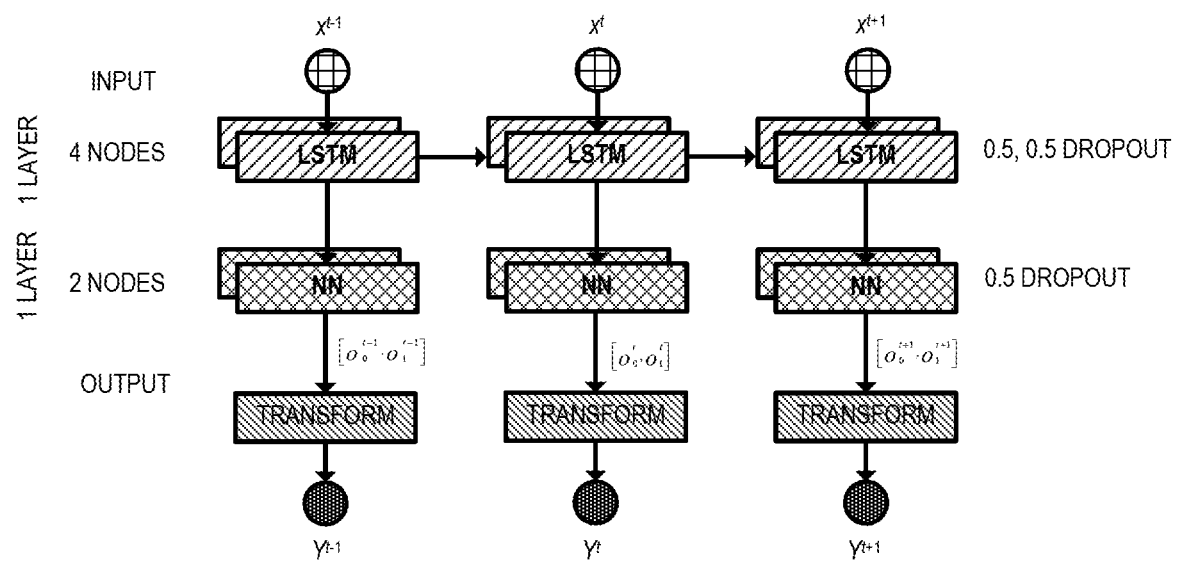
FIG. 3 illustrates an example of the base architecture stack-up in the case of RUL estimation, in accordance with an example implementation.

FIG. 3 illustrates an example of the base architecture stack-up in the case of RUL estimation, in accordance with an example implementation. Variable $x^t$ denotes prepared input data which refers to timestamp t. Corresponding output of the model is denoted as $Y^t$. The information flows from input layer to LSTM layer to NN layer to the transformation and to the output layer which is used to evaluate objective function. This relationship is user-defined. If automatic feature extraction is needed, then the base architecture stack-up relationship can have been input layer to convolutional layer to LSTM layer to NN layer to the output layer.

As an example, in the case of RUL estimation, as shown in FIG. 3 the main optimization initializes the network architecture parameters as 1 LSTM layer with 4 LSTM nodes, 1 NN layer with 2 hidden nodes, 0.5 input and output dropout for LSTM layer and 0.5 dropout for NN layer. The outputs from the single deep learning architecture is input to the transform to learn the parameters for the objective function.

Figure 4A:
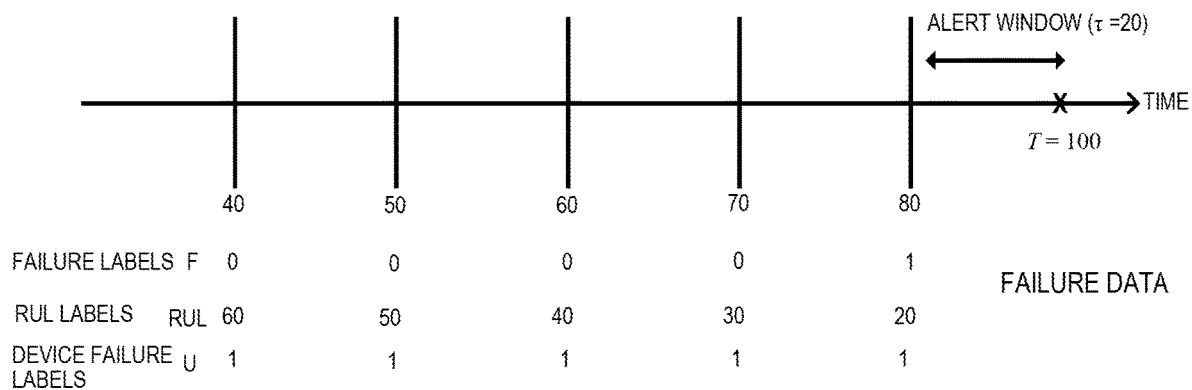
FIG. 4(a) illustrates an example of learned parameters with failure data, in accordance with an example implementation.
Figure 4B:
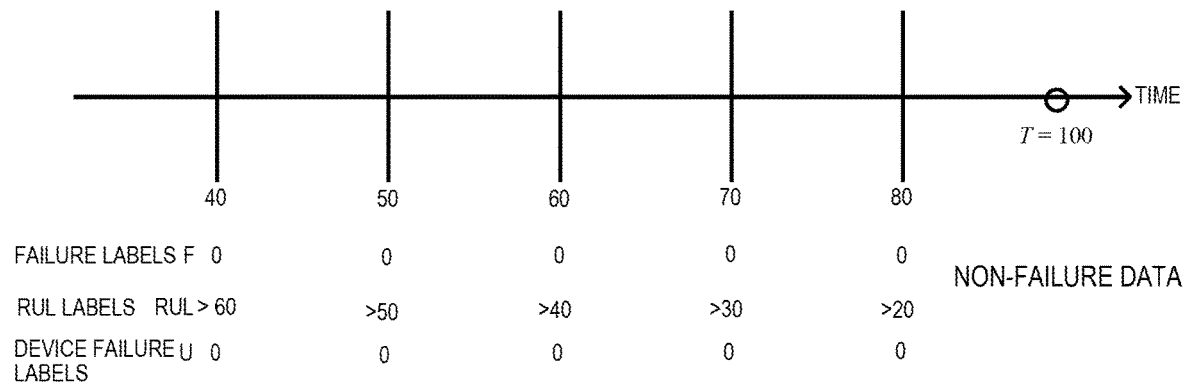
FIG. 4(b) illustrates an example of learned parameters with non-failure data, in accordance with an example implementation.

FIG. 4(a) illustrates an example of learned parameters with failure data, in accordance with an example implementation. FIG. 4(b) illustrates an example of learned parameters with non-failure data, in accordance with an example implementation. The singe deep learning architecture is applied to preprocessed historical data to learn parameters for computation of the objective function that corresponds to the execution mode. Learned parameters can include an alert window, failure labels, RUL labels, and component failure labels. An alert window is application and component dependent. According to an example implementation, user of the system specify alert window for each component, which reflects necessary time to prepare maintenance shop for a repair. The labels are computed from a given data. According to an example aspect, the unified mode of the single deep learning architecture can provide predictions for different alert windows without re-training the model.

Alert Window (τ) denotes the period of time immediately before the failure during which it is required to take a countermeasure to prevent the failure from happening. Failure labels (F) identify input data samples $x^t$ with value 0 if there was no failure event in alert window time from particular time point t ($F^t=0$). Otherwise data sample is labeled with failure label ($F^t=1$). Points within the alert window are not labeled and should be excluded from the model. RUL labels identify input data samples $x^t$ with the time to failure values (failure time–t). Component failure labels (U) identify actual failure with a 1. In an example implementation, each data sample from a component which had actual failure is labeled as 1 while data samples from devices which did not have failure are labeled as 0. According to an example implementation, each execution mode is also associated with an objective function that penalizes for mistakes and/or errors. For example, in failure prediction mode, the objective function can penalize for misclassification of failure labels.

In the example illustrated in FIG. 4(a) for failure data, the alert time window (τ=20, T=100), for a failure predicted at time 80, the data is labeled with a 1. The data is labeled with a RUL value based that counts down the remaining useful life from a value of 60 at time 40 down to 0 at time 100 and actual failure U label as 1 at each time window. In the example illustrated in FIG. 4(b) for non-failure data, the alert time window (r=20, T=100), for no failure, all the data is labeled with a 0. The data is labeled with a RUL value based that counts down the remaining useful life from a value of greater than 60 at time 40 because there was no actual failure by time 100 and actual failure U label as 0 at each time window.

Objective functions and transformation functions are specified for each of the three execution modes (e.g., failure prediction mode, RUL mode, unified mode). In an example implementation, it is assumed there are N components for which data is recorded. Each component might have a failure which can appear at the end of sequence. When that particular component experiences multiple failures, data can be split into multiple sub-sequences each ending with a failure. These sub-sequences can be considered as independent components in the model. Accordingly, an indicator function I(x) can be used for each data point, which indicates if data point should be used within objective function. For example, for data that comes from transition modes or alert windows indicator will be 0. In an example implementation, each execution mode is associated with an objective function that penalizes for mistakes and/or errors.

For Failure prediction mode, the transformation between NN output layer (o) and model output (Y) is specified as softmax function:

$$Y^t = \frac{\exp(o_1^t)}{\exp(o_0^t) + \exp(o_1^t)}$$

For Failure prediction mode, the objective function is defined as function of model output ($Y^t$), failure labels ($F^t$) and indicator function ($I^t$). Example implementations can include any of standard classification losses such as cross-entropy, hinge loss etc. For example, in case of cross entropy objective function (L) is defined as $$L = \Sigma_{i=1}^{N} \Sigma_{t=1}^{T_i} I(x_i^t)(-F_i^t \log Y_i^t - w(1-F_i^t)\log(1-Y_i^t)),$$

where $T_i$ is the length of sequence for component i and w is weight which allows for different penalization of misclassified positive and negative examples.

For the RUL mode, the transformation is defined as:

$$Y^t = \max(0, o_0^t)$$

For the RUL mode, the objective function is defined as function of model output ($Y^t$)), remaining useful life labels ($RUL^t$), component failure labels (U), and indicator function (g) as:

$$L = \sum_{i=1}^{N} \left( U_i \sum_{t=1}^{T_i} I(x_i^t) \left( (RUL_i^t - Y_i^t)^2 + w(1-U_i)\sum_{t=1}^{T_i} I(x_i^t)(\max 0, RUL_i^t - Y_i^t) \right)^2 \right)$$

where weight w controls the importance of the data for non-failed devices. Devices that did not fail (second term) the model penalizes only if it predicts shorter remaining useful life than its label.

For the unified mode, both failure prediction and remaining useful life are calculated from unique probability distributions. Random variable are defined to be time to event, where t is current time and T is failure time as $$V_t = T - t | T > t$$

This random variable is always positive, so it is assumed to follows positive probability distribution ($V_t \sim p(\alpha,\beta)$) with two positive parameters α and β (α>0, β>0). Example implementation can use Weibull, Gamma, Log-normal distributions, etc. For example, with log-normal distribution, the output Y of the model is two dimensional and defined as $Y^t=[\alpha^t, \beta^t]$. Transformation is defined to guarantee positive values of $\alpha^t$ and $\beta^t$. For example, one valid transformation is $$\alpha^t = \exp(o_0^t)$$

$$\beta^t = \log(1 + \exp(o_1^t))$$

This approach is not limited to the definition of transformation as soon as it guarantees positive outputs. The objective function to be minimized is negative log-likelihood defined as $$L = -\sum_{i=1}^{N} \left( U_i \sum_{t=1}^{T_i} I(x_i^t) \log p(RUL_i^t, Y_i^t) + w(1-U_i)\sum_{t=1}^{T_i} I(x_i^t) \log(1 - F(RUL_i^t, Y_i^t)) \right)$$

where F is cumulative density function which indicate probability that component failed after RUL time.

The application of the model (e.g., application phase 170 of FIG. 1(b)) uses a streaming data and performs data preparation to prepare parameter x_test. In application phase, none of the labels are necessary. If a component is operating in the conditions that would set indicator function to 0, predictions are not generated.

In failure prediction mode with a given $x_{test}$ applied to a learned failure prediction model, the model outputs probability of component failure occurring in τ time as $$Y_{test} = \frac{\exp(o_1^{test})}{\exp(o_0^{test} + \exp(o_1^{test}))}$$

In the RUL mode, with a given $x_{test}$ applied to a learned remaining useful life model, the model outputs remaining useful life for a component $$Y_{test} = \max(0, o_0^{test})$$

In the unified mode, with a given $x_{test}$, applied to a learned unified model, the model outputs predicts parameters of the probability distribution of time to failure as $$\alpha_{test} = \exp(o_0^{test})$$

$$\beta_{test} = \log(1 + \exp(o_1^{test}))$$

$$V_{test} \sim p(\alpha_{test}, \beta_{test})$$

In the unified mode, there is no restriction on predicting for particular alert window τ. This approach provides probability for any alert window size without re-training the model.

The probability that component will fail within x time is obtained as $$P(\tau; t) = \Pr(V_{test} \leq \tau) = F_{test}(\tau)$$

RUL is estimated as expected value of random variable $V_{test}$ $$\widehat{RUL} = E(V_{test})$$

Accordingly, the single deep learning architecture allow for different probability distribution choices with flexibility for learning independent models to optimize predictive maintenance scheduling.

Figure 5:
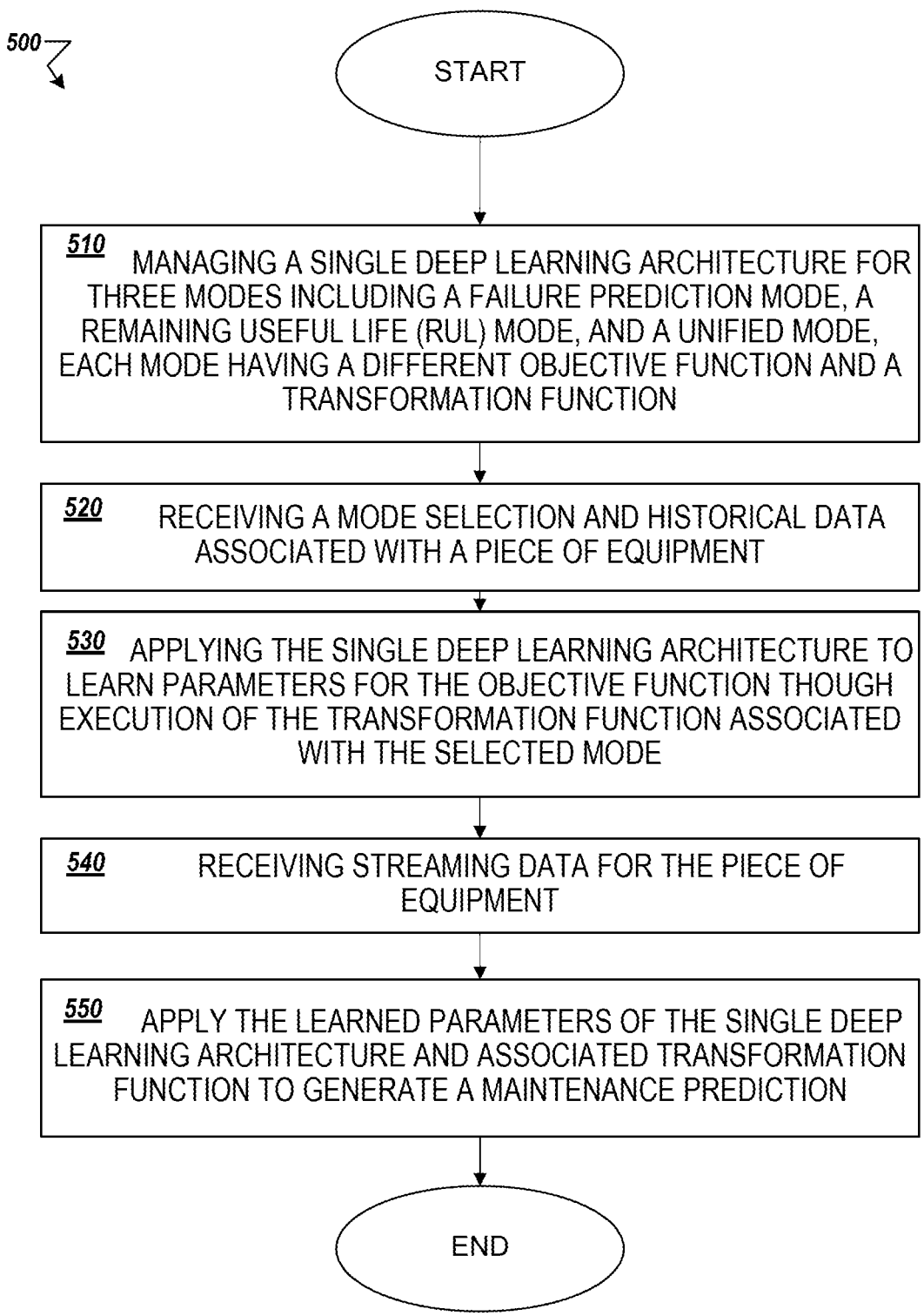
FIG. 5 illustrates a flow diagram for an example process, in accordance with an example implementation.

FIG. 5 illustrates a flow diagram for an example process 500, in accordance with an example implementation. The example process 500 is performed by processing logic that may comprise hardware (circuitry, dedicated logic, etc.), software (such as operates on a general purpose computer system or a dedicated machine), or a combination of both. The example process 500 may be performed by the deep learning architecture 120 of FIG. 1. Process 500 may also be performed by other processing logic.

At block 510, a processor can manage a single deep learning architecture for three modes comprising a failure prediction mode, a remaining useful life (RUL) mode, and a unified mode. Each mode is associated with an objective function and a transformation function. The unified mode is based on failure prediction and RUL calculations, and the objective function and transformation function associated with the unified mode are different from the failure prediction mode and the RUL mode.

At block 520, the processor receives a mode selection from a user and historical data associated with equipment from, for example, a data store or the user. In an example implementation, the historical data is pre-processed to create a common sequence on a component time-scale, feature extraction is performed, and operation status changes can be identify for each component. At block 530, the processor applies the single deep learning architecture to learn parameters of the associated objective function through execution of the associated transformation function of the selected mode.

In an example implementation, the data is analyzed to extract features by applying windows over the pre-processed data using predefined functions over the windows or CNNs. In an example implementation, the pre-processing can include constructing component based sequences to transform a conventional time-scale to a component time-scale, creating a common sequence on the component time-scale using a timestamp from the one or more sensors, updating the historical data to adjust outlier values based on other readings of the same sensor, and calculating sensor values for the common sequence based on the updated historical data. For example, calculating sensor values can include estimating sensor values using regression modeling at common timestamps of the common sequence. The event data can be transformed to time sequences using binary encoding for each type of event. Each element of the common sequence can be labeled as, for example, a failure label, a RUL label, and/or a component failure label. Time periods can be labeled as stable status or transition status based on detected fluctuations in sensor data to identify operation status changes for each component.

After the parameters of the objective function are learned through execution of the associated transformation, streaming data from sensors can be received at block 540. The streaming data can include updated or real-time performance of the equipment. At block 550, the processor applies the learned parameters of the objective function to generate a maintenance prediction for the equipment. For example, the maintenance prediction cam be used to adjust a maintenance schedule or order a part based on the maintenance prediction.

Figure 6:
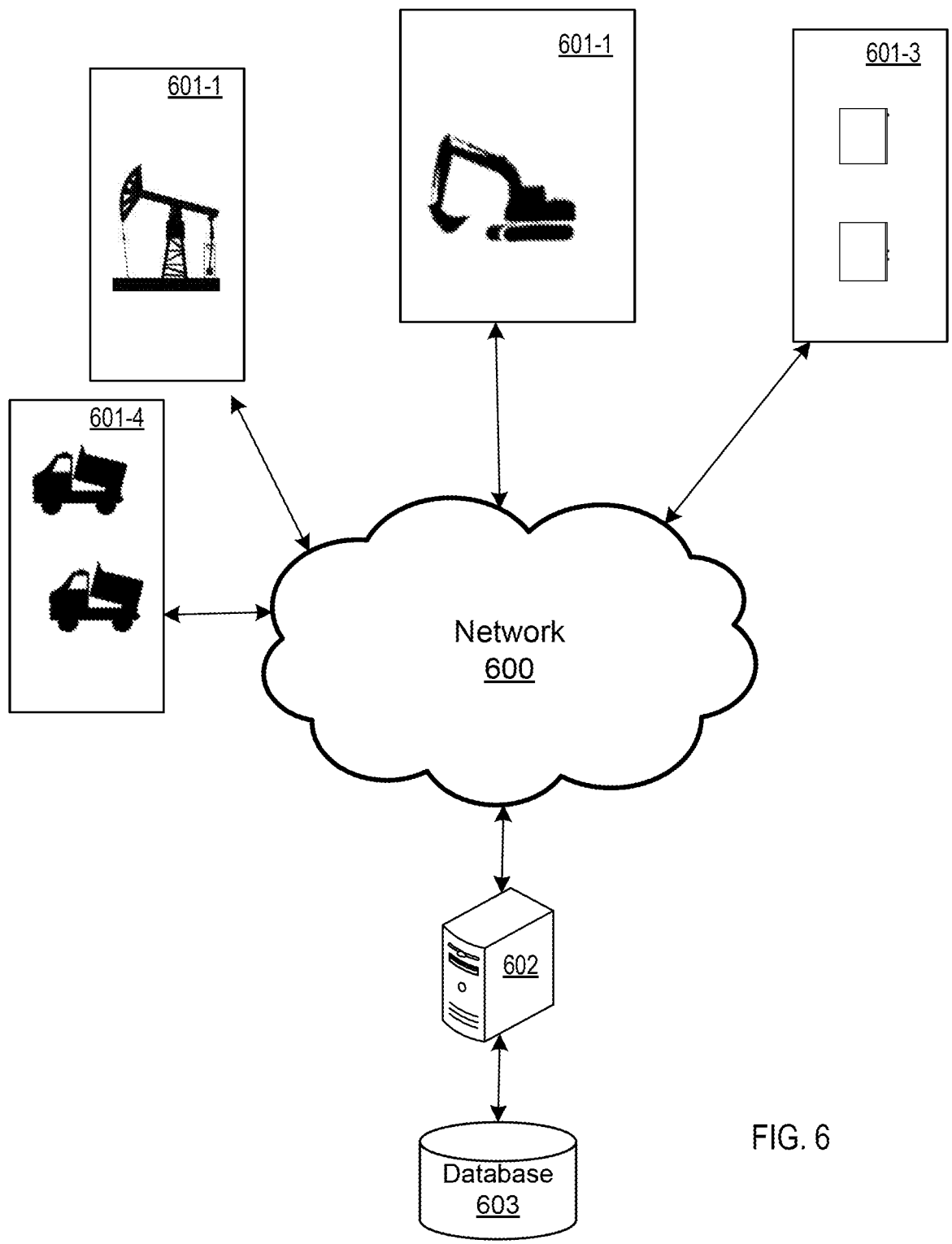
FIG. 6 illustrates an example system upon which example implementations may be applied.

FIG. 6 illustrates a system involving a plurality of apparatuses and a maintenance planning apparatus, in accordance with an example implementation. One or more apparatuses or apparatus systems 601-1, 601-2, 601-3, and 601-4 are communicatively coupled to a network 600 which is connected to a maintenance planning apparatus 602. The maintenance planning apparatus 602 manages a database 603, which contains historical data collected from the apparatuses and apparatus systems in the network 600. In alternate example implementations, the data from the apparatuses and apparatus systems 601-1, 601-2, 601-3, and 601-4 can be stored to a central repository or central database such as proprietary databases that data from equipment or equipment systems such as enterprise resource planning systems, and the maintenance planning apparatus 602 can access or retrieve the data from the central repository or central database. Such apparatuses can include stationary apparatuses such as coolers, air conditioners, servers, as well as mobile apparatuses such as automobiles, trucks, cranes, as well as any other apparatuses that undergo periodic maintenance.

Figure 7:
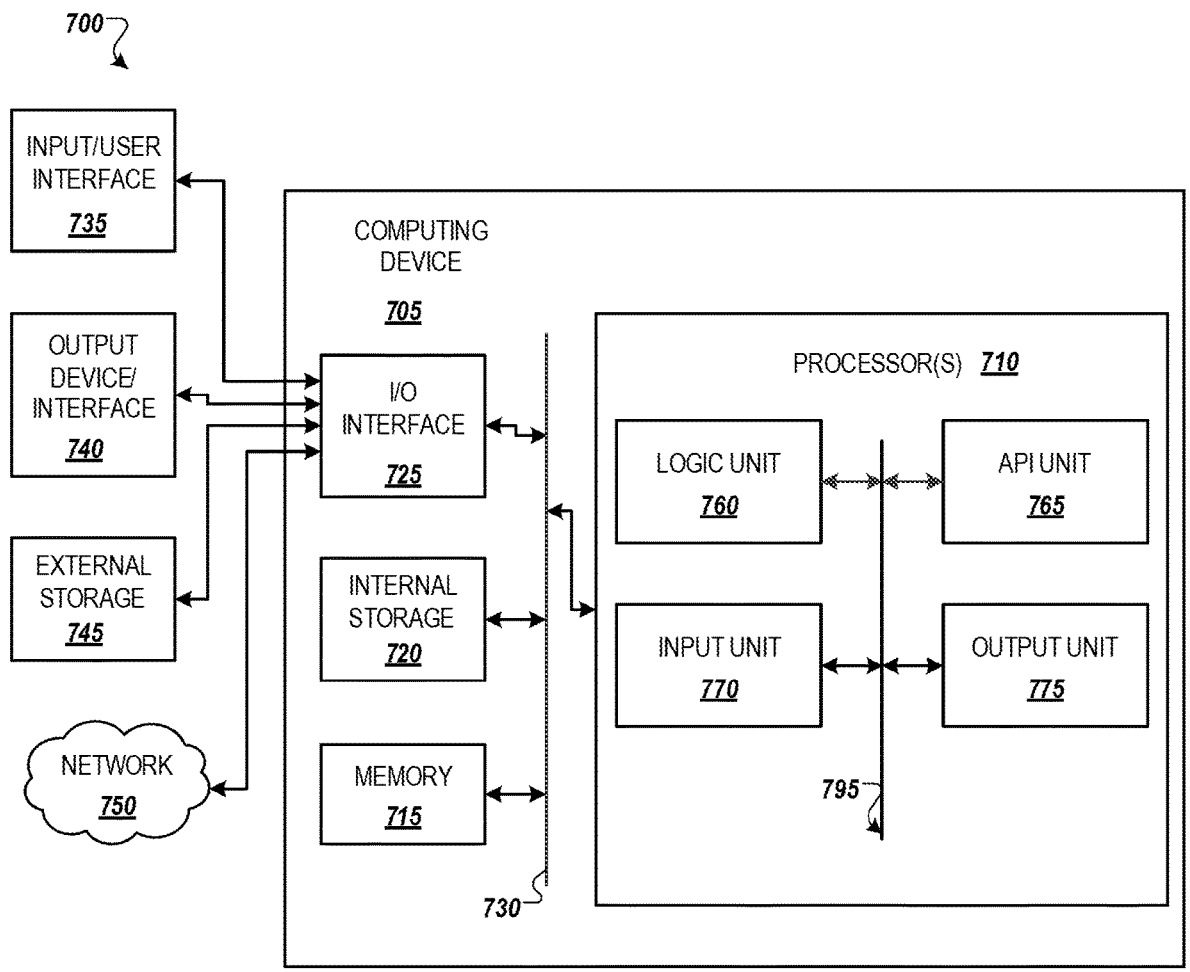
FIG. 7 illustrates an example computing environment with an example computer device suitable for use in some example implementations.

FIG. 7 illustrates an example computing environment with an example computer device suitable for use in some example implementations, such as a management apparatus 602 as illustrated in FIG. 6. Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705. I/O interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

In an example implementation involving a management system configured to manage a single deep learning architecture to generate models stored by the system in memory 715. Processor(s) 710 can be configured manage a single deep learning architecture for three modes comprising a failure prediction mode, a RUL mode, and a unified mode, wherein each mode is associated with an objective function and a transformation function. In response to receiving a mode selection and historical data associated with equipment, the processor can apply the single deep learning architecture to learn parameters of the associated objective function through execution of the associated transformation function of the selected mode. For subsequently received streaming data associated with the equipment, the processor can apply the learned parameters of the single deep learning architecture and associated transformation function to generate a maintenance prediction for the equipment, as illustrated in the flow diagram of FIG. 5.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "managing," "processing," "computing," "calculating," "determining," "adjusting," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A system comprising a processor, configured to:
   manage a single deep learning architecture for three modes comprising a failure prediction mode, a remaining useful life (RUL) mode, and a unified mode, wherein each mode is associated with an objective function and a transformation function;
   in response to receiving a mode selection and historical data associated with equipment, apply the single deep learning architecture to learn parameters of the associated objective function through execution of the associated transformation function of the selected mode; and
   for subsequently received streaming data associated with the equipment, apply the learned parameters of the single deep learning architecture and associated transformation function to generate a maintenance prediction for the equipment.

2. The system of claim 1, wherein the unified mode is based on failure prediction and RUL calculations, and the objective function and transformation function associated with the unified mode are different from the objective function and transformation function associated with the failure prediction mode and the objective function and transformation function associated with the RUL mode.

3. The system of claim 1, wherein to learn parameters comprises conducting model training to generate a predictive model for the selected mode, wherein the generated trained model is used to determine different estimates for the equipment based on the selected mode.

4. The system of claim 1, wherein to learn the parameters comprises creating labels for each element of a common sequence, wherein the labels comprise one or more of a failure label, a RUL label, and a component failure label.

5. The system of claim 1, wherein the processor is further configured to:
   pre-process the historical data into a format consumable with the single deep learning architecture;
   perform feature extraction on the pre-processed data; and
   identify operation status changes for each component.

6. The system of claim 5, wherein the pre-process comprises:
   constructing component based sequences to transform a conventional time-scale to a component time-scale;
   creating a common sequence on the component time-scale using a timestamp from the one or more sensors;
   updating the historical data to adjust outlier values based on other readings of the same sensor; and
   calculating sensor values for the common sequence based on the updated historical data.

7. The system of claim 6, wherein calculating sensor values comprises estimating sensor values using regression modeling at common timestamps of the common sequence, and wherein event data is transformed to time sequences using binary encoding for each type of event.

8. The system of claim 5, wherein to perform feature extraction comprises applying windows over the pre-processed data using predefined functions over the windows or convolutional neural networks (CNNs).

9. The system of claim 5, wherein to identify operation status changes for each component comprises labeling time periods as stable status or transition status based on detected fluctuations in sensor data.

10. The system of claim 1, wherein the processor is further configured to at least one of:
    adjust a maintenance schedule based on the maintenance prediction, and
    order a part based on the maintenance prediction.

11. A method comprising:
    managing a single deep learning architecture for three modes comprising a failure prediction mode, a remaining useful life (RUL) mode, and a unified mode, wherein each mode is associated with an objective function and a transformation function;
    in response to receiving a mode selection and historical data associated with equipment, applying the single deep learning architecture to learn parameters of the associated objective function through execution of the associated transformation function of the selected mode; and
    for subsequently received streaming data associated with the equipment, applying the learned parameters of the single deep learning architecture and associated transformation function to generate a maintenance prediction for the equipment.

12. The method of claim 11, wherein learning parameters comprises:
conducting model training to generate a predictive model for the selected mode, wherein the generated trained model is used to determine different estimates for the equipment based on the selected mode.

13. The method of claim 11, wherein the streaming data is received from equipment sensors based on a time series and sampling rate.

14. The method of claim 11, further comprising:
adjusting a maintenance schedule based on the maintenance prediction; or
ordering a part based on the maintenance prediction.

15. A non-transitory computer readable medium, storing instructions, that when executed by a processor, cause the instructions to:
manage a single deep learning architecture for three modes comprising a failure prediction mode, a remaining useful life (RUL) mode, and a unified mode, wherein each mode is associated with an objective function and a transformation function;
in response to receiving a mode selection and historical data associated with equipment, apply the single deep learning architecture to learn parameters of the associated objective function through execution of the associated transformation function of the selected mode; and
for subsequently received streaming data associated with the equipment, apply the learned parameters of the single deep learning architecture and associated transformation function to generate a maintenance prediction for the equipment.

16. The non-transitory computer readable medium of claim 15, wherein learning the parameters comprises creating labels for each element of a common sequence, wherein the labels comprise one or more of a failure label, a RUL label, and a component failure label.

17. The non-transitory computer readable medium of claim 16, wherein to learn parameters the instructions are further to conduct model training to generate a predictive model for the selected mode, wherein the generated trained model is used to determine different estimates for the equipment based on the selected mode.

18. The non-transitory computer readable medium of claim 15, wherein the instructions are further to pre-process the historical data into a format consumable with the single deep learning architecture; perform feature extraction on the pre-processed data; and identify operation status changes for each component.

19. The non-transitory computer readable medium of claim 18, wherein the pre-process comprises instructions to:
construct component based sequences to transform a conventional time-scale to a component time-scale;
create a common sequence on the component time-scale using a timestamp from the one or more sensors;
update the historical data to adjust outlier values based on other readings of the same sensor; and
calculate sensor values for the common sequence based on the updated historical data.

20. The non-transitory computer readable medium of claim 15, wherein the instructions are further to pre-process the historical data to create a common sequence on a component time-scale.

* * * * *